United States Patent
Clark et al.

(10) Patent No.: US 9,141,660 B2
(45) Date of Patent: Sep. 22, 2015

(54) INTELLIGENT EVIDENCE CLASSIFICATION AND NOTIFICATION IN A DEEP QUESTION ANSWERING SYSTEM

(71) Applicant: International Business Machines Corporation, Armonk, NY (US)

(72) Inventors: Adam T. Clark, Mantorville, MN (US); Mark G. Megerian, Rochester, MN (US); John E. Petri, St. Charles, MN (US); Richard J. Stevens, Monkton, VT (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/717,146

(22) Filed: Dec. 17, 2012

(65) Prior Publication Data

US 2014/0172878 A1   Jun. 19, 2014

(51) Int. Cl.
   *G06F 17/30* (2006.01)
(52) U.S. Cl.
   CPC ...... *G06F 17/30386* (2013.01); *G06F 17/3053* (2013.01); *G06F 17/30654* (2013.01)
(58) Field of Classification Search
   CPC .............. G06F 17/30654; G06F 17/30675; G06F 17/30684; G06F 17/30634; G06F 17/30401; G06F 17/30011; G06F 17/30976; G06F 17/30386

USPC .................................................. 707/736, 748
See application file for complete search history.

(56) References Cited

U.S. PATENT DOCUMENTS

| | | |
|---|---|---|
| 2007/0022109 A1 | 1/2007 | Imielinski et al. |
| 2009/0235356 A1* | 9/2009 | Jensen et al. .................... 726/23 |
| 2010/0191686 A1 | 7/2010 | Wang et al. |
| 2011/0125783 A1 | 5/2011 | Whale et al. |
| 2011/0320187 A1 | 12/2011 | Motik et al. |
| 2012/0041950 A1* | 2/2012 | Koll et al. ...................... 707/728 |
| 2012/0078891 A1 | 3/2012 | Brown et al. |
| 2014/0006012 A1 | 1/2014 | Zhou et al. |
| 2014/0172139 A1 | 6/2014 | Clark et al. |
| 2014/0172756 A1 | 6/2014 | Clark et al. |
| 2014/0172880 A1 | 6/2014 | Clark et al. |
| 2014/0172882 A1 | 6/2014 | Clark et al. |
| 2014/0172883 A1 | 6/2014 | Clark et al. |

* cited by examiner

*Primary Examiner* — Thu-Nguyet Le
(74) *Attorney, Agent, or Firm* — Patterson & Sheridan, LLP

(57) ABSTRACT

System, method, and computer program product to identify changes in evidence used to answer questions by a deep question answering system, by identifying a first evidence related to a feature, the deep question answering system having identified the feature as being relevant to answering a first type of question of a plurality of types of questions, and responsive to: (i) detecting a change in the first evidence, and (ii) determining that a confidence score of a first response generated for a first question, of the first type of question, exceeds a confidence threshold, generating an updated response for the first question based on the changed first evidence.

19 Claims, 6 Drawing Sheets

INTELLIGENT EVIDENCE CLASSIFICATION AND NOTIFICATION IN A DEEP QUESTION ANSWERING SYSTEM

CROSS-REFERENCE TO RELATED APPLICATIONS

This application is related to co-pending U.S. patent application Ser. No. 13/717,043, and co-pending U.S. patent application Ser. No. 13/717,105, which were all filed on the same day as the present application. Each of the aforementioned related patent applications is herein incorporated by reference in its entirety.

BACKGROUND

Embodiments disclosed herein relate to the field of computer software. More specifically, embodiments disclosed herein relate to computer software which implements intelligent evidence classification and notification in a deep question answering system.

SUMMARY

Embodiments disclosed herein provide a system, method, and computer program product to identify changes in evidence used to answer questions by a deep question answering system, by identifying a first evidence related to a feature, the deep question answering system having identified the feature as being relevant to answering a first type of question of a plurality of types of questions, and responsive to: (i) detecting a change in the first evidence, and (ii) determining that a confidence score of a first response generated for a first question, of the first type of question, exceeds a confidence threshold, generating an updated response for the first question based on the changed first evidence.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
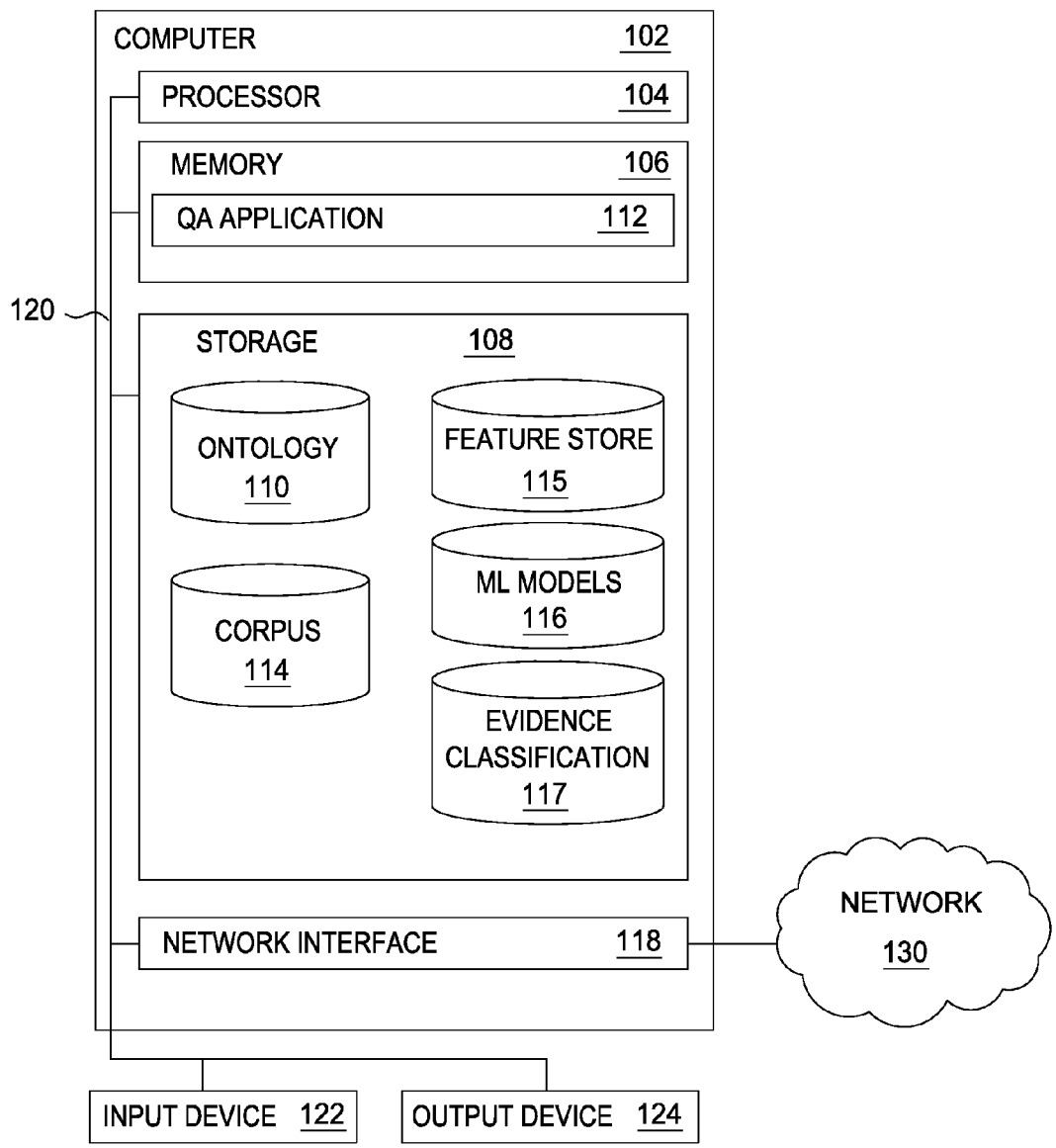
FIG. 1 is a block diagram illustrating a system for intelligent evidence classification and notification in a deep question answering system, according to one embodiment disclosed herein.

Embodiments disclosed herein train a deep question answering system (deep QA system) to classify questions, identify features (or annotators) which are the most relevant in generating an answer to those classes of questions, and store a mapping identifying the relationship. The questions may be classified based on type, information related to the person or entity asking the question, and other contextual information. Once highly relevant features for each class of question are identified, the embodiments disclosed herein may look for these features when answering another question of the same or similar class. If the feature is not part of a candidate answer for a similar question, processing of the candidate answer may be skipped in order to improve the amount of time and processing required to generate a response to that case. Additionally, embodiments disclosed herein monitor evidence linked to the highly relevant features for changes that may significantly impact a confidence in previously generated answers based on the unchanged evidence. Upon detecting a change in the evidence, the deep QA system may reprocess old questions or generate new questions to test whether a change in evidence results in a change in the correct answer. The deep QA system may also inform users who previously asked questions if the evidence change affected the correct answer to their questions.

Generally, embodiments disclosed herein address the need for frequent question and answer analysis in a deep QA system. This need is highlighted in financial services, social networking, and marketing contexts, where near real-time information and answers are critical. In such environments, similar questions may be asked by multiple users every second, and any processing that may be eliminated may improve the performance of the deep QA system. A feature, as used herein, may be defined as a concept used to identify evidence which is used to generate a response to a case presented to the deep question answering system. A feature may be a calculated or generated score or characteristic produced in a specific manner. For example, a feature may measure the existence of some characteristic, or it may try to evaluate the entire accuracy of a given candidate answer for the current question. Individual features may be used in conjunction with machine learning to determine the final score for a given candidate answer. A case (also referred to as a question), which may comprise multiple questions, may be a query presented to the deep QA system.

A deep QA system may process cases through a single analysis "pipeline." A pipeline may represent the execution of various analysis programs, or engines, on both the question text and candidate answers (i.e., text passages extracted from documents in a corpus) in order to deduce a probable correct answer. A typical pipeline may begin with question analysis, which analyzes and annotates each question presented in the case to identify key attributes upon which a search may be conducted. The next step of the pipeline may include a primary search, which involves searching for documents in the corpus using the key attributes from the question analysis phase. The deep QA system may then generate candidate answers, which may involve identifying key matching passages from the search results with passages in the candidate answers. The deep QA system may then retrieve supporting evidence for the candidate answers. Finally, the deep QA system may complete the pipeline by scoring the various candidate answers, from which a correct answer may be selected.

Unique pipelines may be created for each domain or problem space (e.g. a different pipeline is used for supporting cancer treatments, insurance claims, diagnoses, and general knowledge, etc.). In fact, analysis engines themselves may be unique to a particular domain (e.g., identification of a tumor stage or size, identification of drugs, potential drug interactions, etc.). Question and answer analysis within a pipeline may also include complex natural language processing algorithms, used, for example, to identify deep semantic relationships within the text. The scoring phase of a deep QA system, such as IBM's Watson, may call various scoring algorithms to help deduce a correct answer (or response) to a case. A scoring algorithm may generate one or more feature scores to indicate how confident it is in its answer. The deep QA system may also use a training phase to learn which features, or combinations of features, are best at predicting the right answers for different types of questions. Once the deep QA system has been properly trained, subsequent questions flowing through the pipeline may use the machine-learned model for finding the most likely correct answer.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a deep question answering system or related data available in the cloud. For example, the deep question answering system could execute on a computing system in the cloud and provide question classification and feature mapping. In such a case, the deep question answering system could classify questions, map features and store the resultant data sets at a storage location in the cloud. Doing so allows a user to access this information from any computing system attached to a network connected to the cloud (e.g., the Internet).

FIG. 1 is a block diagram illustrating a system 100 for intelligent evidence classification and notification in deep question answering systems, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the QA application 112, which is an application generally configured to operate a deep question answering (QA) system. One example of a deep question answering system is Watson, by the IBM Corporation of Armonk, N.Y. A user may submit a case (also referred to as a question) to the QA application 112, which will then provide an answer to the case based on an analysis of a corpus of information. The QA application 112 may execute a pipeline to generate a response to the case, which is returned to the user. The QA application 112 may further be configured to classify questions, identify features highly relevant to generating a correct response to the questions, and store the resulting relationships for later use. The QA application 112 may further be configured to perform partial or parallel pipeline execution. For example, if a class of question has been identified as having a feature highly predictive of a correct answer, and a candidate answer for a question received by the QA application 112 does not contain the feature, the QA application 112 may not process that candidate answer to improve performance and conserve resources. Finally, the QA application 112 may monitor evidence underlying relevant features for changes. If a change is detected, and the QA application 112 believes that the change may impact a generated answer, the QA application 112 may reprocess the question to ensure that a correct response is provided. Additionally, the QA application 112 may generate new questions, based on the changed evidence, to determine whether the answer changed along with the evidence. Upon detecting the change in evidence, the QA application 112 may inform users that responses to their previously submitted cases may have changed based on the change in evidence.

As shown, storage 108 contains the ontology 110, corpus 114, feature store 115, ML models 116, and evidence classification 117. The ontology 110 provides a structural framework for organizing information. An ontology formally represents knowledge as a set of concepts within a domain, and the relationships between those concepts. The corpus 114 is a body of information used by the QA application 112 to generate answers to cases. For example, the corpus 114 may contain scholarly articles, dictionary definitions, encyclopedia references, and the like. Feature store 115 stores a mapping between question context and features which are highly predictive in generating a response to the question, such that the features may be identified when processing additional questions containing the same context. If the features are not present in candidate answers for the question, processing of those candidate answers by the QA application 112 may be skipped to improve performance and efficiency. Machine learning (ML) models 116 are models created by the QA application 112 during the training phase, which are used during a runtime pipeline to score and rank candidate answers to cases based on features previously generated for each answer. Evidence classification 117 stores relationships between evidence from the corpus 114, the question context, and the predictive features. Based on these stored relationships, the QA application may monitor the underlying evidence for a change. If a change is detected, and the QA application 112 determines that the change undermines a degree of confidence in response generated using the evidence, the QA application 112 may reprocess the questions, or alert users to the change. Although depicted as a database, ontology 110, corpus 114, feature store 115, ML models 116, and evidence classification 117 may take any form sufficient to store data, including text files, xml data files, and the like. In one embodiment, the ontology 110 is part of the corpus 114. Although depicted as residing on the same computer, any combination of the QA application 112, the ontology 110, corpus 114, feature store 115, ML models 116, and evidence classification 117 may reside on the same or different computers.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2:
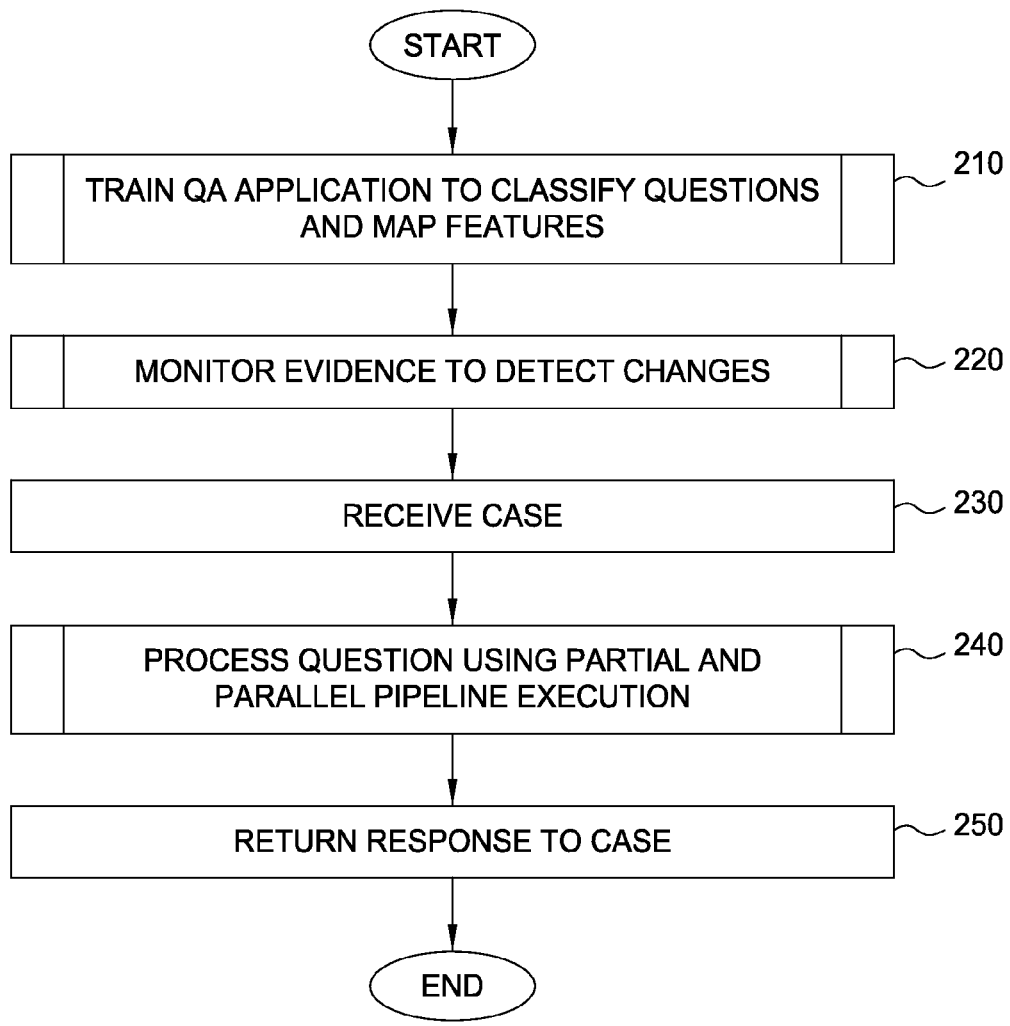
FIG. 2 is a flow chart illustrating a method for generating a response to a case by a deep question answering system, according to one embodiment disclosed herein.

FIG. 2 is a flow chart illustrating a method 200 for generating a response to a case by a deep question answering system, according to one embodiment disclosed herein. The method 200 modifies the traditional execution pipeline of the QA application 112, such that the pipeline includes question classification and feature mapping, partial or parallel pipeline execution, and evidence monitoring to detect changes which may impact the correctness of generated responses. In one embodiment, the QA application 112 performs the steps of the method 200. At step 210, the QA application 112 is trained to classify questions and map features to the questions based on a sample input case. During the training process, the QA application 112 identifies which combination of features was "essential," or strongly indicative for answering the questions in the case. Stated differently, the QA application 112 may identify which feature, or combination of features, has the greatest weight in generating a correct answer based on the context of the question. When a subsequent question is asked, the QA application 112 may determine how similar the question is to the previously processed questions. If a computed similarity measure exceeds a predefined similarity threshold, the QA application 112 may only use the essential features in generating a response to the question. For example, if a first case includes a question on whether it is a good time to buy a house, the QA application 112 may identify a training question related to whether people should rent or buy homes. The QA application 112 may compute a similarity score of the two cases by analyzing the concepts, features, and related data. If the cases share sufficient commonalities, the QA application 112 may compute a similarity score that exceeds the similarity threshold, such that when the first case is processed, the features of the training case are utilized. The step 210 is discussed in greater detail with reference to FIG. 3.

At step 220, the QA application 112 monitors evidence to detect changes in the evidence which may impact the confidence in a generated response. Although depicted as a single step, the QA application 112 may continuously monitor the evidence in the corpus 114, even in the absence of a case being processed, such that the confidence of previously generated answers is maintained. The step 220 is discussed in greater detail with reference to FIG. 4. At step 230, the QA application 112 receives an input case, which may comprise multiple questions, from a user. At step 240, the QA application 112 may process the question using partial and parallel pipeline execution. In one embodiment, the full pipeline may be executed at step 240. Generally, partial pipeline execution may be implemented to limit the amount of processing completed by the QA application 112 to improve system performance. The QA application 112 may skip the processing of candidate answers not containing the features identified at step 210 in order to reduce the amount of processing, and therefore time, needed to return an answer. At step 250, the QA application 112 returns a response to the case.

Figure 3:
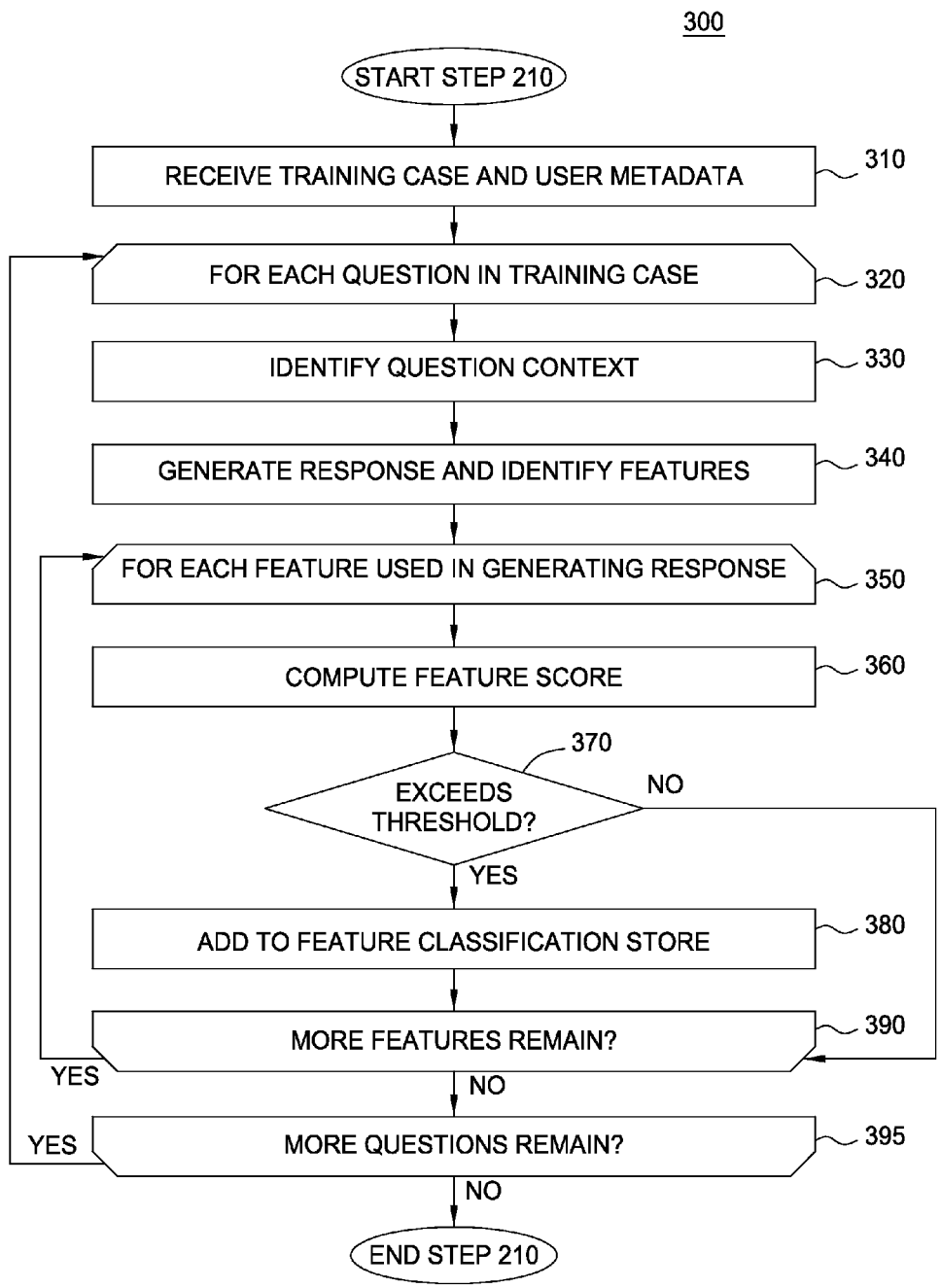
FIG. 3 is a flow chart illustrating a method for training a deep question answering system to classify questions and map features, according to one embodiment disclosed herein.

FIG. 3 is a flow chart illustrating a method 300 corresponding to step 210 for training a deep question answering system to classify questions and map features, according to one embodiment disclosed herein. In one embodiment, the QA application 112 performs the steps of the method 300. Generally, during the training phase, the QA application 112 determines how a question of a case should be classified, or categorized, based on several factors, including, but not limited to, the question type, information (or metadata) related to the person or entity asking the question, and other contextual information. The training phase may comprise an entire pipeline. During the answer scoring and evidence scoring phase of the training pipeline, the QA application 112 may identify the most predictive features, or annotators, for the particular question type. The question context (including all relevant information used to classify the question), as well as any associated highly predictive features, may be written to the feature classification 117 for later use.

At step 310, the QA application 112 receives the training case and metadata related to the user asking the question. The metadata of the user may include the user's role, affiliation, expertise, preferences, or any other attribute of the user, or an entity the user represents. When subsequent cases are received by the QA application 112, the user metadata of that user may be analyzed when computing a similarity score to previously asked (or training) questions, and stored in the feature store 115. At step 320, the QA application 112 begins executing a loop containing steps 330-395 for each question in the training case. At step 330, the QA application 112 identifies the question type, or context. Any suitable method may be used to identify the question context, including natural language processing to extract normalized terms and concepts from the question. At step 340, the QA application 112 generates a response to the case, and identifies the features used in generating the response. For example, if the question relates to whether the exchange rate for the Japanese Yen and the U.S. Dollar is favorable on a particular day, a plurality of variables, or features, may be considered. The features may include whether the currencies, are overvalued, the price of gold, and current inflation rates. The QA application, in generating the response indicating whether the exchange rate is favorable, may also store information related to which feature, or combination of features, was most relevant in generating the response to the question.

At step 350, the QA application 112 begins executing a loop including steps 360-390 for scoring each feature identified at step 340. At step 360, the QA application 112 computes a feature score for the feature. The feature score may be computed by any suitable measure, including the ability of the feature to lead to a correct answer for the question or case. A feature score may be produced using an algorithm of ranging complexity to produce a representative score for a specific candidate answer. The algorithm may, for example, compare the number of similar words between the candidate answer and the question, or it may parse the meaning of the question to match terms, context, negation, plurality, conjunctions, and chronology, for example. The feature score itself may be a number in a permissible range of feature scores. At step 370, the QA application 112 determines whether the feature score exceeds a predefined feature threshold. The feature threshold may be a default threshold, or a threshold specified by the user. If the computed feature score exceeds the feature threshold, the feature is added to the feature classification store 117 at step 380. The feature, user metadata, and question context (including all relevant information used to classify the question), may be written to the feature classification store 117 as related entities. If the computed feature score does not exceed the feature threshold, the QA application 112 proceeds to step 390. At step 390, the QA application 112 determines whether more features remain to be scored. If more features remain, the QA application 112 returns to step 350. Otherwise, the QA application 112 proceeds to step 395. At step 395, the QA application 112 determines whether more questions of the training case remain. If more questions remain, the QA application 112 returns to step 320. Otherwise, the training phase is complete and the method 300 ends.

Figure 4:
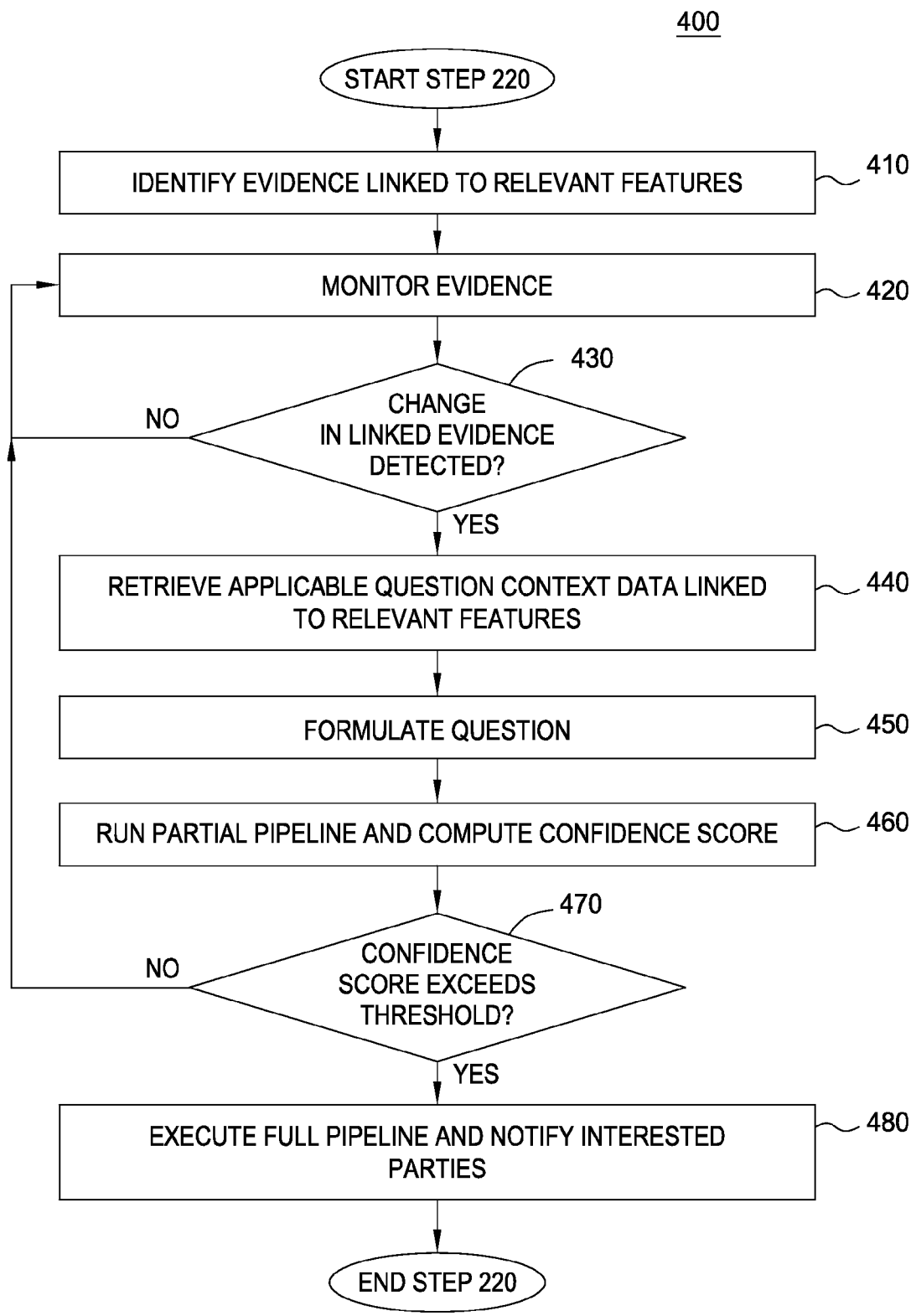
FIG. 4 is a flow chart illustrating a method for monitoring evidence to detect changes in the evidence, according to one embodiment disclosed herein.

FIG. 4 is a flow chart illustrating a method 400 corresponding to step 220 for monitoring evidence to detect changes in the evidence, according to one embodiment disclosed herein. Generally, the steps of the method 400 are executed to detect significant changes in key supporting evidence, providing an automated way to trigger partial or parallel pipeline execution. To accomplish this, critical evidence needed to answer a given question, or type of question, which has been run through a full pipeline is identified. For example, the QA application 112 may receive a case containing a question which asks, "Is the exchange rate for the Japanese Yen and U.S. Dollar favorable today?" In order to answer the question, the QA application 112 may need to consider a number of features (or variables) related to the Tokyo Stock Exchange, including whether the dollar and yen are overvalued, whether gold prices are overvalued, and whether the U.S. and Japanese inflation rates are above normal. All of these features may rely on underlying data (supporting evidence), which changes very frequently. Through machine learning, the QA application 112 may determine that when the U.S. inflation rate is greater than some value, it is never a good idea to exchange yen for dollars, regardless of other features. This is considered a "strong indicator." When a strong indicator is identified, its impact on the final answer should be much greater than other features. However, this may not imply that a strong indicator is the sole input to determining an answer, but it may help implicate answers that are completely inacceptable given the current evidence. The features, and the variables they may represent, may be more complex than simple reference values. For example, the variable considering whether the U.S. dollar is overvalued may take into account expert insights and opinions contained within natural language documents in addition to the current value of the U.S. dollar. Through the use of the method 400, the QA application 112 may utilize the correlation between the feature and the underlying data to know that significant changes in the data will affect the feature score. In one embodiment, the QA application 112 implements a confidence score which indicates the overall confidence that a change in the evidence will result in a change in the answer.

The QA application 112 may monitor both missing (identified, but not existent) and existing evidence. The QA application 112 may note when a feature has identified highly relevant evidence which does not exist, or where it does not have sufficient evidence to produce a meaningful confidence score. However, when the QA application 112 detects that the data has changed in meaningful ways, such as through the newly found existence of specific missing evidence, or a significant change in existing evidence, the QA application 112 may execute another partial pipeline. If the partial pipeline indicates a high likelihood for a change in the answer, then the QA application 112 may execute a full pipeline, and may notify users who have asked similar questions in the past.

Additionally, the QA application 112 may generate a subset of the corpus 114 which contains just those pieces of evidence, such as documents, which are both relevant and have a significant impact to a given question. The QA application 112 may consider a number of relevancy filtering methods, including the ability to select only documents which contain a sufficient number of concepts and attributes with are also expressed within the case or question. Subsetting the corpus to only those documents which are applicable to a given question reduces the number of documents that have the potential to trigger full or partial reprocessing of the question.

At step 410, the QA application 112 identifies evidence linked to relevant features. In one embodiment, the QA application 112 identifies the evidence based on a comparison to the entries in evidence classification 117. As previously stated, the evidence classification 117 may store relationships between the relevant features, the question context, and evidence types. Therefore, the QA application 112 may identify evidence and compare its type to that in the evidence classification 117 to determine whether it comprises evidence which is linked to relevant features. The degree of impact a supporting evidence article has on a question may be determined by the features influenced by the article and the weight assigned to those features by the machine learning model in use for the specific use case. One example of this optimization may be cases where there are no essential supporting evidence features detected through machine learning, e.g., the weighting assigned to supporting evidence features is very low for a given class of question. Thus, any change to the overall supporting evidence corpus may be ignored without significant impact on answer confidence scores for that type of question.

At step 420, the QA application 112 monitors the evidence. As stated above, the QA application 112 may monitor the entire corpus 114, or a subset of evidence related to a particular question class. At step 430, the QA application 112 determines whether a change in linked evidence has occurred. If no change has been detected, the QA application 112 returns to step 420. The change may be detected, in the case of missing evidence, by the presence of evidence. For existing evidence, the change may be detected by monitoring a content of the evidence. Generally, any suitable method may be used to monitor the evidence. If a change in evidence has been detected, the QA application 112 proceeds to step 440. Upon detecting a change in the evidence, the QA application 112 may reprocess a previously submitted question, or generate a new question, to determine whether the confidence score for the question has changed such that the answer has changed as well. At step 440, the QA application 112, in generating a new question, retrieves the applicable question context data linked to the relevant features. By obtaining the context, the QA application 112 at step 450 may formulate a new question. At step 460, the QA application 112 may run a partial pipeline on the new question (or, the previously submitted question), and compute a corresponding confidence score. The confidence score may be based on the relevance score of the feature, a degree of change in the evidence, or any other suitable method. The confidence score may be any value based on a scale suitable to indicate a range of confidence scores. At step 470, the QA application 112 determines whether the confidence score exceeds the confidence threshold. The confidence threshold may be a default threshold, or a user-defined threshold. If the confidence score does not exceed the confidence threshold, the QA application 112 returns to step 420. If the confidence score exceeds the confidence threshold, then the QA application 112 may determine, to a certain degree of probability, that the answer to the class of question may have changed along with the evidence. Therefore, if the confidence score exceeds the confidence threshold, the QA application 112 proceeds to step 470, where the QA application 112 executes a full pipeline, and optionally may notify interested parties who have previously submitted similar questions.

Figure 5:
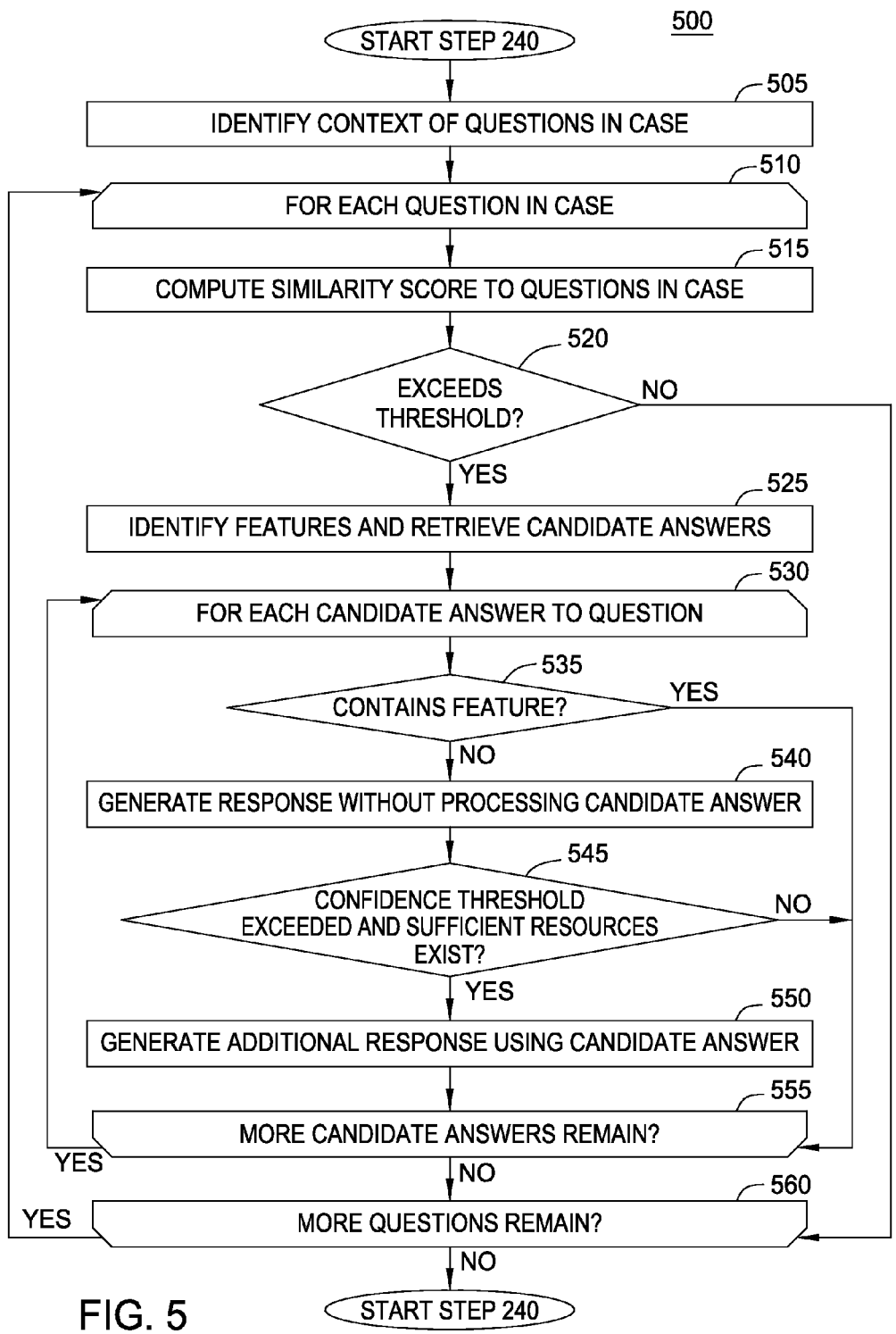
FIG. 5 is a flow chart illustrating a method for processing a question using partial and parallel pipeline execution, according to one embodiment disclosed herein.

FIG. 5 is a flow chart illustrating a method 500 corresponding to step 240 for processing a question using partial and parallel pipeline execution, according to one embodiment disclosed herein. The steps of the method 500 may be executed to improve efficiency of responses generated to frequently asked questions. The QA application 112 may use the context-mapped features identified in step 210 to run partial pipelines to improve efficiency. A partial pipeline is one in which not all phases need to be run in order for the QA application 112 to be reasonably certain that a previously generated response has not changed. To make this possible, the QA application 112 keeps track of the dependencies for each essential feature scorer. When a partial pipeline is executed, only the minimum number of steps required to fire each essential feature is executed, enabling the QA application 112 to "short circuit" the full pipeline. Thus, the QA application 112 will execute only those annotators associated with the highly predictive features. In one embodiment, the QA application 112 may keep track of all classes and external resources used by a feature-generating class during the training phase. Once these essential annotators are identified, the answer scoring, supporting evidence retrieval, and evidence scoring components of the pipeline may be executed for the candidate answers having the relevant features. For example, a full pipeline may not be executed on a candidate answer not containing a feature whose feature score exceeds the feature threshold. In such an event, the QA application 112 may skip the execution of several steps of the full pipeline, including running natural language processing on the candidate answer, determining whether the candidate answer contains a different highly relevant feature, retrieving supporting evidence for the candidate answer, and scoring the supporting evidence for the candidate answer.

At step 505, the QA application 112 may identify the context of questions in the case. At step 510, the QA application 112 begins executing a loop including steps 515-560 for each question in the case. At step 515, the QA application 112 computes a similarity score for the question relative to the plurality of questions stored in the feature store 115. The similarity score may be based on any number of factors, including a comparison of normalized concepts in the question and the concepts stored in the feature store 115 related to the question class/type. At step 520, the QA application 112 determines whether the computed similarity score exceeds a similarity threshold. The similarity threshold may be any range of values, and may be a system default or user-defined threshold. If the similarity score exceeds the threshold, indicating that the questions are sufficiently similar, the QA application 112 proceeds to step 525. Otherwise, the QA application 112 proceeds to step 560. At step 525, the QA application 112 identifies highly relevant features from the feature store 115 related to the type of case. Additionally, at step 525, the QA application 112 may retrieve candidate answers it has generated for the question.

At step 530, the QA application 112 executes a loop including steps 535-555 for each candidate answer to the current question. At step 535, the QA application 112 determines whether the candidate answer contains each feature identified as highly relevant in the feature store 115 for that type of question. If the candidate answer contains the feature, then further processing of that candidate answer may be required, and the QA application 112 proceeds to step 555. Although not depicted, the QA application 112 may execute a full pipeline on the candidate answer containing the feature. If the candidate answer does not contain the feature, the QA application 112 proceeds to step 540, where the QA application 112 may generate a response to the question without processing the candidate answer, thereby saving system resources by not performing unnecessary processing of the candidate answers not containing the highly relevant feature. At step 545, the QA application 112 determines whether to implement parallel processing in times where system resources are plenary. At step 545, the QA application 112 determines whether a confidence threshold is exceeded by a confidence score for the response generated by the partial pipeline, and whether sufficient resources exist. The confidence threshold may be related to the confidence threshold discussed with reference to FIG. 4, in that it conveys a degree of confidence as to whether there would be a likely change in the answer based on the execution of the partial pipeline. If sufficient resources exist and the confidence threshold has been exceeded, the QA application 112 proceeds to step 550. Otherwise, the QA application 112 proceeds to step 555. At step 550, the QA application 112 runs a full pipeline in parallel with the partial pipeline to generate an additional response using the candidate answer. The QA application 112 may then compare the responses to determine which has a greater confidence score, and report its findings to the user asking the question, or may simply present the response having the greater confidence score. At step 555, the QA application 112 determines whether more candidate answers remain to be analyzed. If more candidate answers remain, the QA application 112 returns to step 530. Otherwise, the QA application 112 proceeds to step 560. At step 560, the QA application 112 determines whether more questions remain in the case. If more questions remain, the QA application 112 returns to step 510. Otherwise, the method 500 ends.

Figure 6:
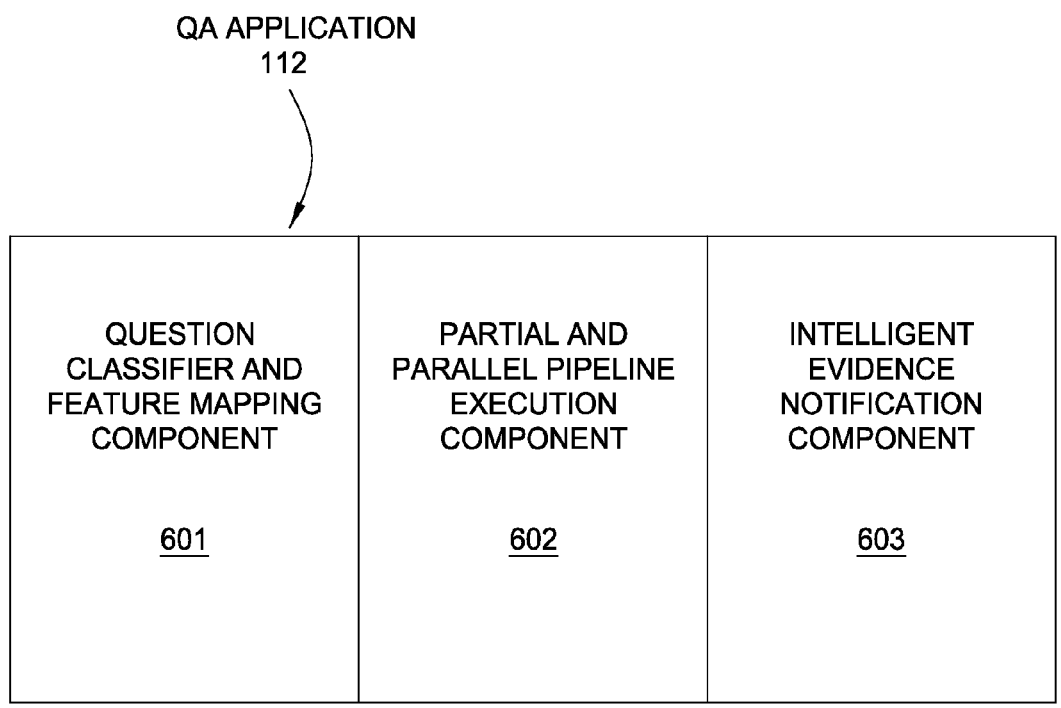
FIG. 6 is a block diagram illustrating components of a deep question answering system, according to one embodiment disclosed herein.

FIG. 6 is a block diagram illustrating components of a deep question answering system, according to one embodiment disclosed herein. In one embodiment, the deep question answering system is the QA application 112. As shown, the QA application 112 contains a question classifier and feature mapping component 601, a partial and parallel pipeline execution component 602, and an intelligent evidence notification component 603. The question classifier and feature mapping component 601 may, during the training phase, classify questions based on type, and identify the features which are most highly relevant in generating a correct response to the questions in a training case. Once identified, the features may be stored in a feature store, such as feature store 115. The partial and parallel pipeline execution component 602 may, when presented with a subsequent case, access the dependencies defined in the feature store 115 to reduce processing of candidate answers that do not have the features identified as highly relevant to answering a particular class of question. The intelligent evidence notification component 603 may identify relevant types of evidence and monitor evidence of this type to determine whether it has changed. The evidence may be existent or non-existent. Upon detecting a change, the intelligent evidence notification component 603 may predict whether the change in evidence has an impact on the confidence of a response generated using the changed evidence. In such a scenario, the intelligent evidence notification component 603 may reprocess questions to determine whether the answer has changed, and may further notify interested parties of the results.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product to identify changes in evidence used to answer questions by a question answering system, the computer program product comprising:
    a non-transitory computer-readable storage medium having computer-readable program code embodied therewith, the computer-readable program code comprising:
        computer-readable program code configured to identify a first evidence related to a feature, wherein the question answering system has identified the feature as being relevant to answering a first type of question of a plurality of types of questions;
        computer-readable program code configured to detect a change in the first evidence;
        computer-readable program code configured to determine that a confidence score of a first response generated for a first question, of the first type of question, exceeds a confidence threshold;
        computer readable program code configured to output, to a user, a notification of the change in the first evidence; and
        computer readable program code configured to, responsive to receiving approval from the user to update the first response, generate an updated response for the first question based on the change in the first evidence and the confidence score exceeding the confidence threshold.

2. The computer program product of claim 1, wherein a user provides the approval.

3. The computer program product of claim 1, wherein the updated response is based on at least one of: (i) processing of a second question, of the first type, and (ii) reprocessing the first question.

4. The computer program product of claim 3, wherein the second question is generated by one of: (i) the question answering system, and (ii) a user.

5. The computer program product of claim 1, wherein the first evidence is unavailable, wherein the change in the first evidence comprises an availability of the first evidence.

6. The computer program product of claim 1, wherein the first evidence is available, wherein the change in the first evidence comprises a change in a content of the first evidence.

7. The computer program product of claim 1, further comprising monitoring the first evidence to detect the change.

8. The computer program product of claim 7, wherein the first evidence is monitored upon determining that a relevance score of the first evidence exceeds a relevance threshold, wherein the first evidence comprises a content of at least one of: (i) a document, (ii) a variable, (iii) an article, and (iv) a web page, and wherein the first question is part of a first case comprising at least the first question.

9. A system, comprising:
    one or more computer processors; and
    a memory containing a program which when executed by the one or more computer processors, performs an operation to identify changes in evidence used to answer questions by a deep question answering system, the operation comprising:
        identifying a first evidence related to a feature, wherein the question answering system has identified the feature as being relevant to answering a first type of question of a plurality of types of questions;
        detecting a change in the first evidence
        determining that a confidence score of a first response generated for a first question, of the first type of question, exceeds a confidence threshold;
        outputting, to a user, an indication of the change in the first evidence; and
        responsive to receiving approval from the user to update the first response, generating an updated response for the first question based on the change in the first evidence and the confidence score exceeding the confidence threshold.

10. The system of claim 9, wherein a user provides the approval.

11. The system of claim 9, wherein the updated response is based on at least one of: (i) processing of a second question, of the first type, and (ii) reprocessing the first question.

12. The system of claim 11, wherein the second question is generated by one of: (i) the question answering system, and (ii) a user.

13. The system of claim 9, wherein the first evidence is unavailable, wherein the change in the first evidence comprises an availability of the first evidence.

14. The system of claim 9, wherein the first evidence is available, wherein the change in the first evidence comprises a change in a content of the first evidence.

15. The system of claim 9, further comprising monitoring the first evidence to detect the change.

16. The system of claim 15, wherein the first evidence is monitored upon determining that a relevance score of the first evidence exceeds a relevance threshold, wherein the first evidence comprises a content of at least one of: (i) a document, (ii) a variable, (iii) an article, and (iv) a web page, and wherein the first question is part of a first case comprising at least the first question.

17. A non-transitory computer readable storage medium storing instructions which when executed by a processor performs an operation to identify changes in evidence used to answer questions by a question answering system, the operation comprising:
    identifying a first evidence related to a feature, wherein the question answering system has identified the feature as being relevant to answering a first type of question of a plurality of types of questions;
    generating an updated response for the first question based on the changed first evidence responsive to: (i) detecting a change in the first evidence, and (ii) determining that a confidence score of a first response generated for a first question, of the first type of question, exceeds a confidence threshold; and notifying a user of the change in the first evidence, wherein the updated response is generated upon approval of the user.

18. The non-transitory computer-readable storage medium of claim 17, the operation further comprising monitoring the first evidence to detect the change.

19. The non-transitory computer-readable storage medium of claim 18, wherein the first evidence is monitored upon determining that a relevance score of the first evidence exceeds a relevance threshold, wherein the first evidence comprises a content of at least one of: (i) a document, (ii) a variable, (iii) an article, and (iv) a web page, and wherein the first question is part of a first case comprising at least the first question.

\* \* \* \* \*